April 15, 1941.  A. H. THOREN  2,238,832
FISHING LURE
Filed May 11, 1939
*Fig. 1.*
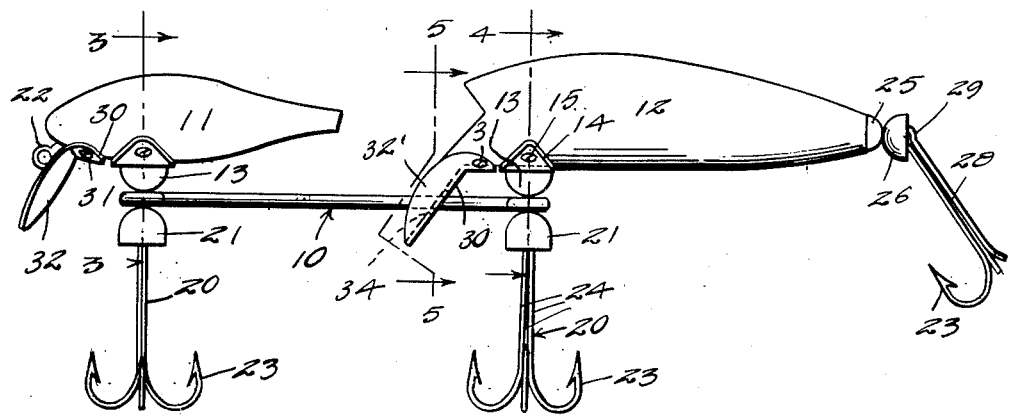
*Fig. 2.*
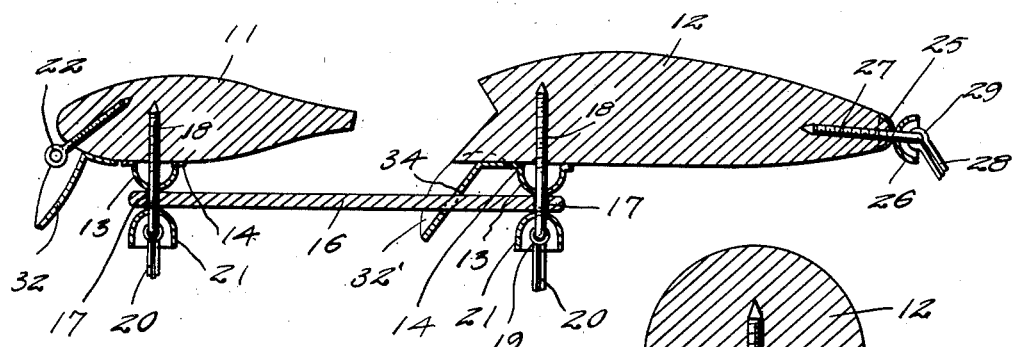
*Fig. 3.*
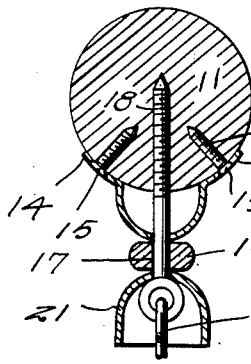
*Fig. 4.*
*Fig. 5.*
Inventor
Albin H. Thoren
By L. F. Randolph
Attorney Patented Apr. 15, 1941

2,238,832

UNITED STATES PATENT OFFICE 2,238,832

FISHING LURE

Albin H. Thoren, Chicago, Ill.

Application May 11, 1939, Serial No. 273,100

10 Claims. (Cl. 43—46)

This invention relates to an improved artificial fishing lure constructed to simulate a minnow being chased by a fish.

More particularly, it is an aim of this invention to provide an artificial lure comprising two lure bodies arranged in tandem relationship and swivelly mounted relatively to a common connector for permitting said bodies to swing during movement through the water to simulate the motion of a minnow being chased by a small fish.

It frequently occurs in fishing with artificial bait constructed to simulate a minnow, that the bait will be taken by a small fish which will in turn attract a larger fish of a type that commonly feeds on the smaller fish so that occasionally the larger fish is caught on the hooks of the lure and landed. This invention contemplates an artificial lure particularly intended to attract larger fish and provided with a plurality of hooks on which the fish can be caught in attempting to grab the lure.

Still a further aim of the invention is to provide means for limiting the turning movement of one of the lure bodies relatively to its support; means for limiting the swinging movement of the hooks to prevent the hooks from becoming entangled with each other; and means forming shields or baffles to engage the water as the lure is drawn therethrough to cause the lures to dive and wiggle to more effectively simulate a minnow being chased by a fish.

Other objects and advantages of the invention will hereinafter become more fully apparent from the following description of the drawing, which illustrates a preferred embodiment thereof, and wherein:

Figure 1 is a side elevational view of a lure constructed in accordance with the invention, Figure 2 is a longitudinal vertical central sectional view of the same, Figures 3 and 4 are enlarged transverse vertical sectional views taken along the lines 3—3 and 4—4, respectively, of Figure 1, and Figure 5 is a transverse sectional view taken along the line 5—5 of Figure 1.

Referring more particularly to the drawing, wherein like reference characters designate like or corresponding parts throughout the different views, 10 designates generally the fishing lure comprising the invention which includes the members 11 and 12 which are shaped and sized, relatively to each other to simulate a minnow and fish, respectively. The bodies 11 and 12 may be formed of any suitable material and their surfaces may be colored in any desired manner and style to simulate a minnow and a fish of any desired species.

A cup-shaped bearing member 13 is mounted beneath the bodies 11 and 12, adjacent their forward ends, and is provided with flanges 14 through which extend the threaded fastenings 15, which are embedded in the bodies 11 and 12, as best seen in Figures 3 and 4, to connect them to the cup-shaped bearing members 13. A rod 16 is provided with enlarged end portions having openings forming the eyes 17 through which extend the eye screws 18 and which extend through the bottoms of the bearing members 13 and have their threaded ends embedded in the bodies 11 and 12 to connect said bodies to the ends of the rod 16. The shanks of screws 18 are loosely mounted in the eyes 17 and the cup-shaped members 13 rest on the ends of the rod 16 to form bearings to permit the bodies 11 and 12 to swivel freely relatively to the rod 16. The eyes of the screws 18 are disposed below the rod 16 and are adapted to be loosely connected to the eyes 19 formed on the shank ends of the hooks 20 to support a hook 20 in depending relationship beneath each of the bodies 11 and 12. As best seen in Figures 3 and 4, the inverted cup-shaped guard members 21 are provided with openings in their bottoms through which extend the shanks of the screws 18 to mount a guard member 21 between the eye of each screw 18 and the under side of the bar 16. Guard members 21 are of sufficient depth so that their open ends depend below the eyes 19 of the hooks 20 to form annular abutment surfaces adapted to be engaged by the shanks of the hooks 20 to limit their swinging movement to prevent the hooks from swinging to a point at which they can become entangled with each other.

An eye screw 22 is mounted in the head of the body 11 and is adapted to be connected to the end of a fishing line, not shown, for attaching the lure 10 thereto. A concavo-convex bearing member 25 is mounted on the tail of the body 12 to provide a bearing surface for the cup-shaped guard member 26 which is disposed with its rounded bottom portion engaging the rounded end of the bearing member 25. An eye screw 27 extends through the bottoms of the members 25 and 26 and into the tail of the body 12. A hook 28 has an eyelet 29 in its shank end which is loosely connected to the eyelet of the screw 27 to pivotally mount hook 28 on the tail of the body 12 with the member 26 forming a guard to limit the swinging movement thereof in the same manner as heretofore described in relation to the guard members 21. A shield 30 is secured at one end as by means of the fastening 31 to the under side of the body 11 adjacent its forward end. The forward free end of the shield 30, extends obliquely downwardly and has its side edges, which are tapered, bent forwardly to form a baffle 32, for a purpose which will hereinafter be described. A similarly shaped shield 30' is similarly secured to the forward end of the body 12 and, as seen in Figure 5, is provided with a transverse slot 34 in its baffle portion 32' through which extends the rod 16. The length of slot 34 is substantially greater than the diameter of rod 16 so that shield 30' may swing relatively to rod 16 to provide a limited swivel movement of body 12.

Hooks 20 and 28 are each preferably provided with a plurality of barbs 23 the shanks 24 of which are suitably connected to form the shanks of hooks 20 and 28.

From the foregoing it will be seen, that lure 10 may be connected to a fishing line by means of the eye screw 22 so that when used for trolling the lure 10 will move through the water with the body 11 in front of the body 12 to simulate a minnow being chased by a small fish. Bodies 11 and 12 being swivelly connected to the bar 16 are adapted to swing relatively thereto to simulate a wiggling or darting motion of a minnow and fish, and the baffle portions 32 of the shields 30 30 are adapted to engage the water as the lure 10 is drawn therethrough to cause the bodies 11 and 12 to dive downwardly and swerve from side to side. The fishing line, connected to the head of body 11, and the baffle 32' limits the swivel movement of bodies 11 and 12, respectively, relatively to rod 16 so that the bodies will be pointing in the direction of movement of the lure 10 and so that the head of body 12 will always be pointing toward body 11. The two hooks 20 disposed below the bodies 11 and 12 and the hooks 26 disposed at the tail of the body 12 are adapted to be taken by a fish attempting to grab either of the lure bodies.

Various modifications and changes in the precise construction and arrangement of the parts forming the invention are contemplated and may be resorted to, and the right is therefore reserved to make such variations as fall within the spirit and scope of the invention as hereinafter defined by the appended claims.

I claim as my invention:

1. A device of the class described comprising body members, a spacing element, means swivelly connecting said body members, intermediate of their ends, to the ends of said spacing element, and hooks loosely connected to said means and disposed beneath each of said body members.

2. A device as in claim 1, and means loosely connecting one of said body members to said spacing element for limiting its swivel movement relatively to the other body member.

3. An artificial fish lure comprising a rod having eyes at its ends, a pair of lure bodies, eye screws extending through said eyes and into said lure bodies for swivelly connecting the bodies to the ends of the rod, cup-shaped bearing members disposed between the ends of the rod and said lure bodies, hooks having eyes at their shank ends for loosely engaging the eyes of said screws to pivotally mount the hooks beneath the lure bodies, and concavo-convex guard members carried by said eye screws for limiting the swinging movement of said hooks.

4. A device as in claim 3, one of said lure bodies being adapted to be connected to the fishing line, and means depending from the other lure body for loosely engaging said rod to limit the swivel movement of said last mentioned body.

5. A device as in claim 3, said lure bodies being provided with obliquely depending baffle elements, and one of said baffle elements having a transverse slot for loosely engaging said rod to restrict the swivel movement of one of said bodies.

6. A fishing lure comprising a pair of lure bodies, a rod having eyelets at its ends, means extending through the eyelets for swivelly mounting said lure bodies thereon in tandem spaced apart relationship relatively to each other, and a plurality of hooks pivotally connected to said lure bodies.

7. A fishing lure comprising a pair of lure bodies, and a rod, said lure bodies being swivelly connected, intermediate of their ends, to the ends of the rod.

8. A device as in claim 7, comprising means for limiting the swivel movement of one of the lure bodies.

9. A fishing lure comprising a pair of elongated lure bodies, and a spacing member on which said lure bodies are swivelly mounted, intermediate of their ends, in spaced apart, end to end, relationship relatively to each other, said lure bodies being disposed longitudinally of the spacing member.

10. A fishing lure as in claim 9, comprising means for limiting the swivel movement of said lure bodies.

ALBIN H. THOREN.